United States Patent
Qiao et al.

(10) Patent No.: US 10,264,471 B2
(45) Date of Patent: Apr. 16, 2019

(54) ADAPTIVE MULTI-ANTENNA DATA TRANSMISSION METHOD, APPARATUS, AND SYSTEM

(71) Applicant: Huawei Technologies Co., Ltd., Shenzhen (CN)

(72) Inventors: Deli Qiao, Shenzhen (CN); Ye Wu, Shanghai (CN); Lei Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 15/296,918

(22) Filed: Oct. 18, 2016

(65) Prior Publication Data

US 2017/0041811 A1 Feb. 9, 2017

Related U.S. Application Data

(63) Continuation of application No. PCT/CN2014/075662, filed on Apr. 18, 2014.

(51) Int. Cl.
| | |
|---|---|
| *H04W 24/08* | (2009.01) |
| *H04W 16/28* | (2009.01) |
| *H04B 17/336* | (2015.01) |
| *H04B 7/0413* | (2017.01) |
| *H04B 7/06* | (2006.01) |
| *H04L 5/14* | (2006.01) |

(Continued)

(52) U.S. Cl.
CPC .......... *H04W 16/28* (2013.01); *H04B 7/0413* (2013.01); *H04B 7/0632* (2013.01); *H04B 17/336* (2015.01); *H04L 5/14* (2013.01); *H04W 72/0413* (2013.01); *H04B 7/04* (2013.01)

(58) Field of Classification Search
CPC .. H04B 7/0632; H04B 17/336; H04B 7/0413; H04B 7/04
See application file for complete search history.

(56) References Cited

U.S. PATENT DOCUMENTS

| | | |
|---|---|---|
| 2005/0197071 A1 | 9/2005 | Yoshida et al. |
| 2007/0099669 A1 | 5/2007 | Sadri et al. |

(Continued)

FOREIGN PATENT DOCUMENTS

| | | |
|---|---|---|
| CN | 1675859 A | 9/2005 |
| CN | 101300871 A | 11/2008 |

(Continued)

*Primary Examiner* — Lan-Huong Truong
(74) *Attorney, Agent, or Firm* — Leydig, Voit & Mayer, Ltd.

(57) ABSTRACT

An adaptive multi-antenna data transmission method, apparatus, and system are provided. The adaptive multi-antenna data transmission method includes: acquiring, at a current time interval, a beam adjustment parameter of user equipment UE; adjusting a beam width of the UE according to the beam adjustment parameter of the UE; and performing precoding processing on to-be-transmitted data of the UE according to an adjusted beam width of the UE and direction information of the UE, so as to perform data transmission. A beam width of UE is adjusted, so that a direction of a beam during data transmission can better match a direction of the UE. Therefore, a status or quality of a link for the UE is improved and a performance loss is reduced.

16 Claims, 5 Drawing Sheets

(51) Int. Cl.
    *H04W 72/04*     (2009.01)
    *H04B 7/04*     (2017.01)

(56) References Cited

U.S. PATENT DOCUMENTS

| | | |
|---|---|---|
| 2008/0303718 A1 | 12/2008 | Chiang et al. |
| 2010/0112952 A1* | 5/2010 | Molnar .................. H01Q 1/246 |
| | | 455/63.1 |
| 2012/0202431 A1 | 8/2012 | Hawryluck et al. |
| 2013/0017836 A1* | 1/2013 | Chang .................. H01Q 1/1257 |
| | | 455/452.1 |
| 2013/0142271 A1 | 6/2013 | Nilsson et al. |
| 2013/0182683 A1 | 7/2013 | Seol et al. |
| 2014/0004869 A1* | 1/2014 | Jung .................. H04W 72/0446 |
| | | 455/452.1 |
| 2015/0131750 A1* | 5/2015 | Xue .................... H04B 7/0482 |
| | | 375/267 |
| 2015/0245370 A1* | 8/2015 | Arogyaswami ..... H04W 72/121 |
| | | 370/330 |

FOREIGN PATENT DOCUMENTS

| | | |
|---|---|---|
| CN | 101321008 A | 12/2008 |
| CN | 102202330 A | 9/2011 |
| CN | 103039019 A | 4/2013 |
| CN | 103491553 A | 1/2014 |
| WO | WO 2013125993 A1 | 8/2013 |

* cited by examiner

ADAPTIVE MULTI-ANTENNA DATA TRANSMISSION METHOD, APPARATUS, AND SYSTEM

CROSS-REFERENCE TO RELATED APPLICATIONS

This application is a continuation of International Application No. PCT/CN2014/075662, filed on Apr. 18, 2014, the disclosure of which is hereby incorporated by reference in its entirety.

TECHNICAL FIELD

Embodiments of the present invention relate to the field of communications technologies, and in particular, to an adaptive multi-antenna data transmission method, apparatus, and system.

BACKGROUND

Currently, in multiple-input multiple-output (MIMO) communication, a closed-loop precoding transmission solution that is used in a low-speed scenario and based on channel estimation may provide a quite high array gain. However, when a moving speed of a user increases or when there is a hardware error, a direction of a beam transmitted by a base station is prone to not matching the user, causing a performance loss. Especially when there are a quite large quantity of antennas, a performance loss is more severe. Generally, a base station performs data transmission according to a beam-unrelated parameter of user equipment (UE), which cannot change a status or quality of a link. As a result, an application of a large-scale antenna system in a frequency division duplex (FDD) scenario is greatly restricted.

Based on the foregoing description, in the prior art, a direction of a beam is prone to not matching a user, which causes a relatively large performance loss; especially when there are a quite large quantity of antennas, there is no appropriate data transmission solution in an FDD scenario.

SUMMARY

Embodiments of the present invention provide an adaptive antenna data transmission method, apparatus, and system, so as to resolve a problem in the prior art that a large performance loss is caused due to an improper beam in a multi-antenna scenario.

A first aspect of the present invention provides an adaptive multi-antenna data transmission method, including:

acquiring, at a current time interval, a beam adjustment parameter of user equipment user equipment;

adjusting a beam width of the user equipment according to the beam adjustment parameter of the user equipment; and performing precoding processing on to-be-transmitted data of the user equipment according to an adjusted beam width of the user equipment and direction information of the user equipment, so as to perform data transmission.

In a first possible implementation manner of the first aspect, the acquiring a beam adjustment parameter of user equipment user equipment includes:

receiving the beam adjustment parameter of the user equipment sent by the user equipment.

In a second possible implementation manner of the first aspect, the acquiring a beam adjustment parameter of user equipment user equipment includes:

receiving a beam adjustment reference parameter of the user equipment sent by the user equipment; and determining the beam adjustment parameter of the user equipment according to the beam adjustment reference parameter of the user equipment.

With reference to the second possible implementation manner of the first aspect, in a third possible implementation manner of the first aspect, the beam adjustment reference parameter is a channel quality indicator (CQI) or a signal to interference plus noise ratio (SINR) of the user equipment at the current time interval; and the determining the beam adjustment parameter of the user equipment according to the beam adjustment reference parameter of the user equipment includes:

determining a change speed or change amplitude of an SINR of the user equipment according to the CQI or the SINR of the user equipment at the current time interval and a CQI or an SINR of the user equipment at a previous time interval; and determining the beam adjustment parameter of the user equipment according to the change speed or change amplitude of an SINR of the user equipment.

With reference to the third possible implementation manner of the first aspect, in a fourth possible implementation manner of the first aspect, the determining the beam adjustment parameter of the user equipment according to the change speed or change amplitude of an SINR of the user equipment includes:

if the change speed of an SINR of the user equipment is greater than a first preset value, determining that the beam adjustment parameter of the user equipment is a first adjustment parameter value;

if the change speed of an SINR of the user equipment is less than or equal to the first preset value and is greater than a second preset value, determining that the beam adjustment parameter of the user equipment is a second adjustment parameter value; and if the change speed of an SINR of the user equipment is less than or equal to the second preset value, determining that the beam adjustment parameter of the user equipment is a third adjustment parameter value; or if the change amplitude of an SINR of the user equipment is greater than a third preset value, determining that the beam adjustment parameter of the user equipment is a fourth adjustment parameter value;

if the change amplitude of an SINR of the user equipment is less than or equal to the third preset value and is greater than a fourth preset value, determining that the beam adjustment parameter of the user equipment is a fifth adjustment parameter value; and if the change amplitude of an SINR of the user equipment is less than or equal to the fourth preset value, determining that the beam adjustment parameter of the user equipment is a sixth preset adjustment parameter value.

With reference to the third possible implementation manner of the first aspect or the fourth possible implementation manner of the first aspect, in a fifth possible implementation manner of the first aspect, the adjusting a beam width of the user equipment according to the beam adjustment parameter of the user equipment includes:

using a sum of the beam adjustment parameter of the user equipment and a beam width of the user equipment at the previous time interval as the adjusted beam width of the user equipment.

A second aspect of the present invention provides an adaptive multi-antenna data transmission method, including:

acquiring, by user equipment user equipment, a beam adjustment reference parameter of the user equipment;

determining a beam adjustment parameter of the user equipment according to the beam adjustment reference parameter of the user equipment; and sending the beam adjustment parameter of the user equipment to a base station, so that the base station adjusts a beam width of the user equipment according to the beam adjustment parameter of the user equipment.

In a first possible implementation manner of the second aspect, the beam adjustment reference parameter is a channel quality indicator CQI or a signal to interference plus noise ratio SINR of the user equipment at a current time interval; and the determining a beam adjustment parameter of the user equipment according to the beam adjustment reference parameter of the user equipment includes:

determining, by the user equipment, a change speed or change amplitude of an SINR of the user equipment according to the CQI or the SINR of the user equipment at the current time interval and a CQI or an SINR of the user equipment at a previous time interval; and determining, by the user equipment, the beam adjustment parameter of the user equipment according to the change speed or change amplitude of an SINR of the user equipment.

In a second possible implementation manner of the second aspect, the determining, by the user equipment, the beam adjustment parameter of the user equipment according to the change speed or change amplitude of an SINR of the user equipment includes:

if the change speed of an SINR of the user equipment is greater than a first preset value, determining that the beam adjustment parameter of the user equipment is a first preset adjustment parameter value;

if the change speed of an SINR of the user equipment is less than or equal to the first preset value and is greater than a second preset value, determining that the beam adjustment parameter of the user equipment is a second preset adjustment parameter value; and if the change speed of an SINR of the user equipment is less than or equal to the second preset value, determining that the beam adjustment parameter of the user equipment is a third preset adjustment parameter value; or if the change amplitude of an SINR of the user equipment is greater than a third preset value, determining that the beam adjustment parameter of the user equipment is a fourth preset adjustment parameter value;

if the change amplitude of an SINR of the user equipment is less than or equal to the third preset value and is greater than a fourth preset value, determining that the beam adjustment parameter of the user equipment is a fifth preset adjustment parameter value; and if the change amplitude of an SINR of the user equipment is less than or equal to the fourth preset value, determining that the beam adjustment parameter of the user equipment is a sixth preset adjustment parameter value.

A third aspect of the present invention provides a base station, including:

an acquiring module, configured to acquire, at a current time interval, a beam adjustment parameter of user equipment user equipment;

an adjusting module, configured to: after the acquiring module obtains the beam adjustment parameter of the user equipment, adjust a beam width of the user equipment according to the beam adjustment parameter of the user equipment; and a processing module, configured to: after the adjusting module obtains an adjusted beam width of the user equipment, perform precoding processing on to-be-transmitted data of the user equipment according to the adjusted beam width of the user equipment and direction information of the user equipment, so as to perform data transmission.

In a first possible implementation manner of the third aspect, the acquiring module includes:

a first receiving module, configured to receive the beam adjustment parameter of the user equipment sent by the user equipment;

a second receiving module, configured to receive a beam adjustment reference parameter of the user equipment sent by the user equipment; and a determining unit, configured to: after the second receiving module receives the beam adjustment reference parameter of the user equipment, determine the beam adjustment parameter of the user equipment according to the beam adjustment reference parameter of the user equipment.

With reference to the first possible implementation manner of the third aspect, in a second possible implementation manner of the third aspect, the beam adjustment reference parameter is a channel quality indicator CQI or a signal to interference plus noise ratio SINR of the user equipment at the current time interval; and the determining unit includes:

a first determining unit, configured to: after the second receiving module receives the CQI or the SINR of the user equipment at the current time interval, determine a change speed or change amplitude of an SINR of the user equipment according to the CQI or the SINR of the user equipment at the current time interval and a CQI or an SINR of the user equipment at a previous time interval; and a second determining unit, configured to: after the first determining unit determines the change speed or change amplitude of an SINR of the user equipment, determine the beam adjustment parameter of the user equipment according to the change speed or change amplitude of an SINR of the user equipment.

With reference to the second possible implementation manner of the third aspect, in a third possible implementation manner of the third aspect, the second determining unit is specifically configured to:

if the change speed of an SINR of the user equipment is greater than a first preset value, determine that the beam adjustment parameter of the user equipment is a first preset adjustment parameter value;

if the change speed of an SINR of the user equipment is less than or equal to the first preset value and is greater than a second preset value, determine that the beam adjustment parameter of the user equipment is a second preset adjustment parameter value; and if the change speed of an SINR of the user equipment is less than or equal to the second preset value, determine that the beam adjustment parameter of the user equipment is a third preset adjustment parameter value; or if the change amplitude of an SINR of the user equipment is greater than a third preset value, determine that the beam adjustment parameter of the user equipment is a fourth preset adjustment parameter value;

if the change amplitude of an SINR of the user equipment is less than or equal to the third preset value and is greater than a fourth preset value, determine that the beam adjustment parameter of the user equipment is a fifth preset adjustment parameter value; and if the change amplitude of an SINR of the user equipment is less than or equal to the fourth preset value, determine that the beam adjustment parameter of the user equipment is a sixth preset adjustment parameter value.

With reference to the second possible implementation manner of the third aspect or the third possible implementation manner of the third aspect, in a fourth possible implementation manner of the third aspect, the adjusting module is specifically configured to use a sum of the beam adjustment parameter of the user equipment and a beam width of the user equipment at the previous time interval as the adjusted beam width of the user equipment.

A fourth aspect of the present invention provides user equipment user equipment, including:

a parameter acquiring unit, configured to acquire a beam adjustment reference parameter of the user equipment;

a parameter determining unit, configured to: after the parameter acquiring unit acquires the beam adjustment reference parameter of the user equipment, determine a beam adjustment parameter of the user equipment according to the beam adjustment reference parameter of the user equipment; and a sending unit, configured to: after the parameter determining unit determines the beam adjustment parameter of the user equipment, send the beam adjustment parameter of the user equipment to a base station, so that the base station adjusts a beam width of the user equipment according to the beam adjustment parameter of the user equipment.

In a first possible implementation manner of the fourth aspect, the beam adjustment reference parameter is a channel quality indicator CQI or a signal to interference plus noise ratio SINR of the user equipment at a current time interval; and the parameter determining unit includes:

a change determining unit, configured to: after the parameter acquiring unit acquires the beam adjustment reference parameter of the user equipment, determine a change speed or change amplitude of an SINR of the user equipment according to the CQI or the SINR of the user equipment at the current time interval and a CQI or an SINR of the user equipment at a previous time interval; and an adjustment determining unit, configured to: after the change determining unit determines the change speed or change amplitude of an SINR of the user equipment, determine the beam adjustment parameter of the user equipment according to the change speed or change amplitude of an SINR of the user equipment.

With reference to the first possible implementation manner of the fourth aspect, in a second possible implementation manner of the fourth aspect, the adjustment determining unit is specifically configured to:

if the change speed of an SINR of the user equipment is greater than a first preset value, determine that the beam adjustment parameter of the user equipment is a first preset adjustment parameter value;

if the change speed of an SINR of the user equipment is less than or equal to the first preset value and is greater than a second preset value, determine that the beam adjustment parameter of the user equipment is a second preset adjustment parameter value; and if the change speed of an SINR of the user equipment is less than or equal to the second preset value, determine that the beam adjustment parameter of the user equipment is a third preset adjustment parameter value; or if the change amplitude of an SINR of the user equipment is greater than a third preset value, determine that the beam adjustment parameter of the user equipment is a fourth preset adjustment parameter value;

if the change amplitude of an SINR of the user equipment is less than or equal to the third preset value and is greater than a fourth preset value, determine that the beam adjustment parameter of the user equipment is a fifth preset adjustment parameter value; and if the change amplitude of an SINR of the user equipment is less than or equal to the fourth preset value, determine that the beam adjustment parameter of the user equipment is a sixth preset adjustment parameter value.

A fifth aspect of the present invention provides an adaptive antenna transmission system, including:

the base station provided in the third aspect and the user equipment provided in the fourth aspect.

It can be seen from the foregoing technical solutions that, the embodiments of the present invention have the following advantages:

A base station acquires, at a current time interval, a beam adjustment parameter of user equipment; adjusts a beam width of the user equipment according to the beam adjustment parameter of the user equipment; and performs precoding processing on to-be-transmitted data of the user equipment according to an adjusted beam width of the user equipment and direction information of the user equipment, so as to perform data transmission. A beam width of user equipment is adjusted, so that a direction of a beam during data transmission can better match a direction of the user equipment. Therefore, a status or quality of a link for the user equipment is improved and a performance loss is reduced.

DESCRIPTION OF EMBODIMENTS

The embodiments of the present invention provide an adaptive multi-antenna data transmission method, apparatus, and system, which are used to resolve a problem in the prior art that a large performance loss is caused due to an improper beam in a multi-antenna scenario.

In the following, detailed descriptions are separately provided by using specific embodiments.

To make the invention objectives, features, and advantages of the present invention clearer and more comprehensible, the following clearly describes the technical solutions of the embodiments of the present invention with reference to the accompanying drawings in the embodiments of the present invention. Apparently, the embodiments described in the following are merely some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", "fifth", "sixth", and so on are intended to distinguish between similar objects but do not necessarily indicate a specific order or a specific sequence. It should be understood that the data termed in such a way is interchangeable in proper circumstances so that the embodiments of the present invention described herein can, for example, be implemented in order besides the order illustrated or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
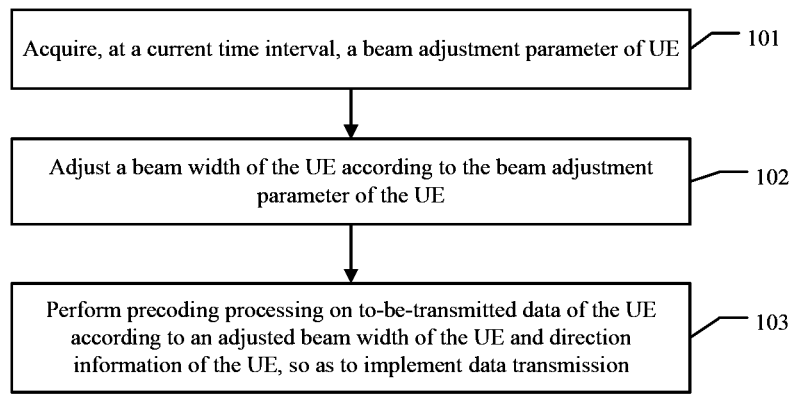
FIG. 1 is a schematic diagram of an adaptive multi-antenna data transmission method according to an embodiment of the present invention.

To better understand the technical solutions of the present invention, refer to FIG. 1, which is an adaptive multi-antenna data transmission method according to an embodiment of the present invention. The method includes:

101. Acquire, at a current time interval, a beam adjustment parameter of user equipment.

In this embodiment of the present invention, a base station may acquire, at the current time interval, the beam adjustment parameter of the user equipment. The time interval is a period for the base station or the user equipment to perform beam width adjusting, and the time interval is a preset period of time and may be 1 second, 5 seconds, or 10 seconds. In an actual application, specific duration of the time interval may be set according to a need, which is not limited herein.

It should be noted that in this embodiment of the present invention, the base station may determine the beam adjustment parameter of the user equipment by using a beam adjustment reference parameter fed back by the user equipment, or the base station may directly receive the beam adjustment parameter of the user equipment fed back by the user equipment.

102. Adjust a beam width of the user equipment according to the beam adjustment parameter of the user equipment.

In this embodiment of the present invention, the base station adjusts the beam width of the user equipment according to the beam adjustment parameter of the user equipment.

The user equipment may be any user equipment in all user equipments in a cell managed by the base station, or may be user equipment having data to be transmitted in a current uplink subframe. In an actual application, a type of user equipment on which beam width adjusting is performed may be determined according to a need, which is not limited herein.

103. Perform precoding processing on to-be-transmitted data of the user equipment according to an adjusted beam width of the user equipment and direction information of the user equipment, so as to implement data transmission.

In this embodiment of the present invention, after obtaining the adjusted beam width of the user equipment, the base station performs precoding processing on the to-be-transmitted data of the user equipment according to the adjusted beam width of the user equipment and the direction information of the user equipment, so as to implement data transmission of the user equipment. The direction information refers to a direction of arrival (DOA) of the user equipment.

The base station may estimate the DOA of the user equipment, and a method used by the base station to estimate the DOA of the user equipment is an existing technology.

In this embodiment of the present invention, a base station acquires, at a current time interval, a beam adjustment parameter of user equipment; adjusts a beam width of the user equipment according to the beam adjustment parameter of the user equipment; and performs precoding processing on to-be-transmitted data of the user equipment according to an adjusted beam width of the user equipment and direction information of the user equipment, so as to perform data transmission. A beam width of user equipment is adjusted, so that a direction of a beam during data transmission can better match a direction of the user equipment. Therefore, a status or quality of a link for the user equipment is improved and a performance loss is reduced.

Figure 2:
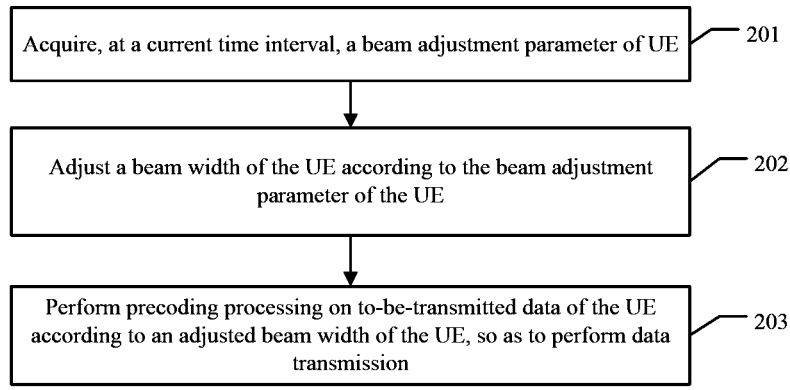
FIG. 2 is another schematic diagram of an adaptive multi-antenna data transmission method according to an embodiment of the present invention.

To better understand the technical solutions of the embodiments of the present invention, an adaptive multi-antenna data transmission method is described, referring to FIG. 2. The method includes:

201. Acquire, at a current time interval, a beam adjustment parameter of user equipment.

In an embodiment of the present invention, a base station may adjust, at the current time interval, a beam width of the user equipment in a range of a cell managed by the base station. Specifically, the base station may acquire the beam adjustment parameter of the user equipment.

In this embodiment of the present invention, the base station may acquire the beam adjustment parameter of the user equipment according to the following manner:

the user equipment obtains the beam adjustment parameter of the user equipment by using a beam adjustment reference parameter, and feeds back the obtained beam adjustment parameter to the base station; or the user equipment feeds back the foregoing beam adjustment reference parameter to the base station, and the base station determines the beam adjustment parameter of the user equipment.

The foregoing beam adjustment reference parameter may be a channel quality indicator (CQI) or a signal to interference plus noise ratio (SINR) of the user equipment.

In a case in which the beam adjustment reference parameter is a CQI of the user equipment, the user equipment may obtain a change speed or change amplitude of an SINR of the user equipment according to a CQI of the user equipment at the current time interval and a CQI of the user equipment at a previous time interval, obtain the beam adjustment parameter of the user equipment according to the change speed or change amplitude of an SINR of the user equipment, and send the obtained beam adjustment parameter of the user equipment to the base station. Alternatively, in a case in which the beam adjustment reference parameter is an SINR of the user equipment, the user equipment may obtain a change speed or change amplitude of an SINR of the user equipment according to an SINR of the user equipment and an SINR of the user equipment at a previous time interval, obtain the beam adjustment parameter of the user equipment according to the change speed or change amplitude of an SINR of the user equipment, and send the obtained beam adjustment parameter of the user equipment to the base station.

That the user equipment obtains the beam adjustment parameter of the user equipment according to the change speed of an SINR of the user equipment specifically includes: if the change speed of an SINR of the user equipment is greater than a first preset value, the user equipment determines that the beam adjustment parameter of the user equipment is a first preset adjustment parameter value; if the change speed of an SINR of the user equipment is less than or equal to the first preset value and is greater than a second preset value, the user equipment determines that the beam adjustment parameter of the user equipment is a second preset adjustment parameter value; and if the change speed of an SINR of the user equipment is less than or equal to the second preset value, the user equipment determines that the beam adjustment parameter of the user equipment is a third preset adjustment parameter value.

Alternatively, that the user equipment obtains the beam adjustment parameter of the user equipment according to the change amplitude of an SINR of the user equipment specifically includes: if the change amplitude of an SINR of the user equipment is greater than a third preset value, the user equipment determines that the beam adjustment parameter of the user equipment is a fourth preset adjustment parameter value; if the change amplitude of an SINR of the user equipment is less than or equal to the third preset value and is greater than a fourth preset value, the user equipment determines that the beam adjustment parameter of the user equipment is a fifth preset adjustment parameter value; and if the change amplitude of an SINR of the user equipment is less than or equal to the fourth preset value, the user equipment determines that the beam adjustment parameter of the user equipment is a sixth preset adjustment parameter value.

In a case in which the beam adjustment reference parameter is a CQI of the user equipment, the user equipment may send a CQI of the user equipment at the current time interval to the base station; after receiving the CQI of the user equipment, the base station obtains a change speed or change amplitude of an SINR of the user equipment according to the CQI of the user equipment at the current time interval and a CQI of the user equipment at a previous time interval; the base station obtains the beam adjustment parameter of the user equipment according to the change speed or change amplitude of an SINR of the user equipment. Alternatively, in a case in which the beam adjustment reference parameter is an SINR of the user equipment, the user equipment may send an SINR of the user equipment at the current time interval to the base station; after receiving the SINR of the user equipment at the current time interval, the base station obtains a change speed or change amplitude of an SINR of the user equipment according to the SINR of the user equipment at the current time interval and an SINR of the user equipment at a previous time interval; the base station obtains the beam adjustment parameter of the user equipment according to the change speed or change amplitude of an SINR of the user equipment.

That the base station obtains the beam adjustment parameter of the user equipment according to the change speed of an SINR of the user equipment may be specifically: if the change speed of an SINR of the user equipment is greater than a first preset value, the base station determines that the beam adjustment parameter of the user equipment is a first preset adjustment parameter value; if the change speed of an SINR of the user equipment is less than or equal to the first preset value and is greater than a second preset value, the base station determines that the beam adjustment parameter of the user equipment is a second preset adjustment parameter value; and if the change speed of an SINR of the user equipment is less than or equal to the second preset value, the base station determines that the beam adjustment parameter of the user equipment is a third preset adjustment parameter value.

Alternatively, that the base station obtains the beam adjustment parameter of the user equipment according to the change amplitude of an SINR of the user equipment may be specifically: if the change amplitude of an SINR of the user equipment is greater than a third preset value, the base station determines that the beam adjustment parameter of the user equipment is a fourth preset adjustment parameter value; if the change amplitude of an SINR of the user equipment is less than or equal to the third preset value and is greater than a fourth preset value, the base station determines that the beam adjustment parameter of the user equipment is a fifth preset adjustment parameter value; and if the change amplitude of an SINR of the user equipment is less than or equal to the fourth preset value, the base station determines that the beam adjustment parameter of the user equipment is a sixth preset adjustment parameter value.

In this embodiment of the present invention, the foregoing change speed of an SINR may be an increased speed of an SINR or may be a decreased speed of an SINR. The change amplitude of an SINR may be an increased value of an SINR or may be a decreased value of an SINR. The change speed and the change amplitude of an SINR are obtained based on the SINR of the user equipment at the previous time interval and the SINR of the user equipment at the current time interval.

It should be noted that in this embodiment of the present invention, the user equipment saves the acquired CQI or the acquired SINR at the current time interval, so that the CQI or the SINR may be used at a next time interval to determine the beam adjustment parameter. The base station also saves the CQI or the SINR that is at the current time interval and sent by the user equipment, so that the CQI or the SINR may be used at a next time interval to determine the beam adjustment parameter of the user equipment.

Each of the foregoing first adjustment parameter value to sixth adjustment parameter value is a preset parameter value for adjusting a beam width of the user equipment. In an actual application, specific values of the first adjustment parameter value to the sixth adjustment parameter value may be set according to a specific need. For example, if a decreased value of an SINR is greater than a preset value N, it may be considered that a beam width, set by the base station, of the user equipment is excessively narrow. As a result, the user equipment enters a beam signal attenuation area during a moving process. In this case, it is determined that the beam adjustment parameter of the user equipment is $\Delta_k$ and $\Delta_k$ is greater than 0, to increase the beam width of the user equipment. If the decreased value of an SINR is less than or equal to the preset value N but is greater than a preset value M, it may be considered that the beam width, set by the base station, of the user equipment is appropriate, and it is determined that the beam adjustment parameter of the user equipment is 0. If the decreased value of an SINR is less than or equal to the preset value M, it may be considered that the beam width, set by the base station, of the user equipment is excessively wide, and it is determined that the beam adjustment parameter of the user equipment is $-\Delta_k$, to decrease the beam width of the user equipment.

The foregoing user equipment may be one user equipment or may be multiple user equipments, and the user equipment may be any user equipment in all user equipments in a range of a cell managed by the base station, or may be user equipment having data to be transmitted in a current uplink subframe. If the base station simultaneously adjusts beam widths of multiple user equipments, some user equipments of the multiple user equipments may be user equipment having data to be transmitted in a current uplink subframe, and remaining user equipments may be user equipment having no data to be transmitted in a current uplink subframe.

Figure 3:
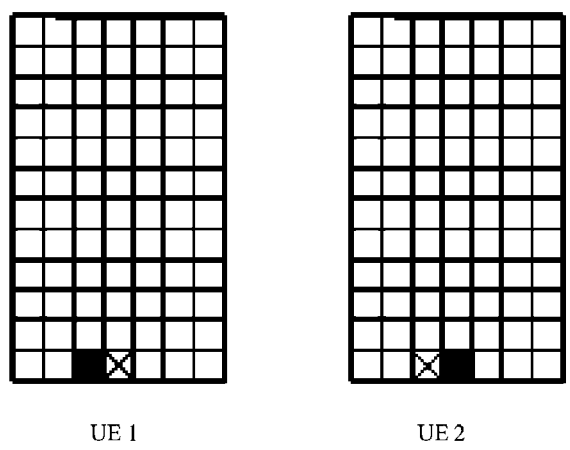
FIG. 3 is a schematic diagram of a beam width modulating pilot according to an embodiment of the present invention.

In this embodiment of the present invention, if the foregoing user equipment is user equipment having no data to be transmitted in a current uplink subframe, for this type of user equipment, the base station may preset a corresponding beam width modulating pilot similar to a demodulation reference signal (DMRS). The beam width modulating pilot is sent after undergoing beamforming precoding of a corresponding user, and therefore, a relatively low overhead is caused. For a setting of the pilot, reference may be made to a pilot setting of a cell reference signal (CRS). Different from the pilot setting of a CRS, the beam width modulating pilot needs to be sent, by using all antennas, after undergoing precoding processing. The user equipment detects a signal at a corresponding pilot location, and estimates an SINR of the user equipment, so as to further determine an adjustment parameter for a beam width. Two user equipments are used as an example. Referring to FIG. 3, FIG. 3 is a schematic diagram of a beam width modulating pilot according to an embodiment of the present invention, where a square block represents a resource element (RE). A signal may be carried in a resource element to implement signal transmission. In FIG. 3, a black resource element is a beam width modulating pilot of user equipment having no data to be transmitted in an uplink subframe, and a resource element with one "x" represents that the user equipment has no data to be transmitted in an uplink subframe. Signals in resource elements, having pilots, of UE 1 and UE 2 are separately sent after undergoing precoding. On a user equipment side, user equipment may obtain a signal that is in a resource element (RE) location having no pilot to be sent, so as to obtain an SINR through calculation, where the signal is an interference signal.

202. Adjust a beam width of the user equipment according to the beam adjustment parameter of the user equipment.

Figure 4:
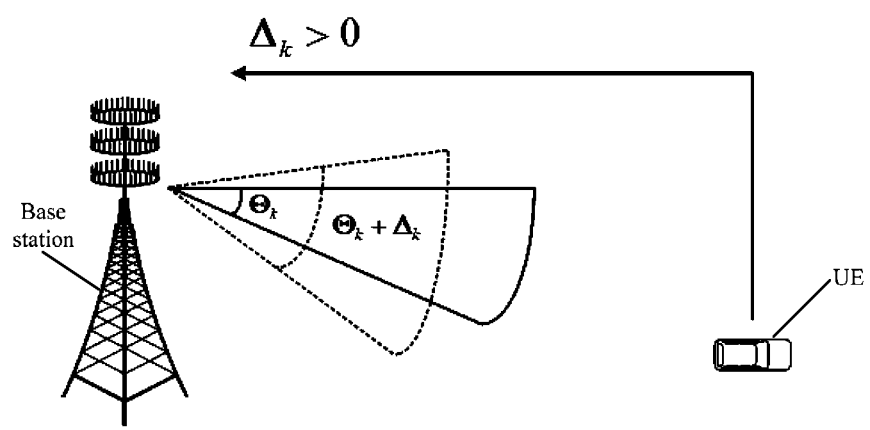
FIG. 4 is a schematic diagram of modulating a beam width according to an embodiment of the present invention.

In this embodiment of the present invention, after obtaining the beam adjustment parameter of the foregoing user equipment, the base station adjusts the beam width of the user equipment according to the beam adjustment parameter of the user equipment. Specifically, a sum of the beam adjustment parameter of the user equipment and a beam width of the user equipment at the previous time interval is used as an adjusted beam width of the user equipment. Referring to FIG. 4, FIG. 4 is a schematic diagram of adjusting a beam width according to an embodiment of the present invention, where $\Theta_k$ represents a beam width, before being adjusted, of user equipment, an angle formed by solid lines in FIG. 4 is $\Theta_k$, and $\Delta_k$ is an adjustment parameter for a beam broadband of the user equipment. The user equipment directly sends the beam adjustment parameter $\Delta_k$ to a base station. After obtaining the beam adjustment parameter, the base station adds the beam width $\Theta_k$, before being adjusted, of the user equipment to the beam adjustment parameter $\Delta_k$ to obtain an adjusted beam width $\Theta_k+\Delta_k$ of the user equipment, where the adjusted beam width is an angle formed by dashed lines in FIG. 4.

203. Perform precoding processing on to-be-transmitted data of the user equipment according to an adjusted beam width of the user equipment, so as to perform data transmission.

In this embodiment of the present invention, after obtaining the adjusted beam width of the user equipment, the base station may perform precoding processing on the to-be-transmitted data of the user equipment according to the adjusted beam width of the user equipment and direction information of the user equipment, so as to perform data transmission. Specifically, the base station may obtain the adjusted beam width of the user equipment by using the adjusted beam width of the user equipment; obtain precoding information of the user equipment according to the adjusted beam width and a DOA, of the user equipment, obtained by the base station through estimation; perform precoding processing on the to-be-transmitted data of the user equipment by using the precoding information; and send, by using a beam, data that has undergone the precoding to the user equipment.

A method used by the base station to estimate a DOA of the user equipment is an existing technology. Methods used by the base station to obtain precoding information of the user equipment according to the DOA and a beam width of the user equipment, perform precoding processing on to-be-transmitted data of the user equipment by using the precoding information, and send data that has undergone the precoding processing are all existing technologies, which are not described herein again.

It should be noted that in this embodiment of the present invention, when adjusting a beam width of user equipment, a base station may set a beam width of user equipment on which beam width adjusting is not performed to a preset value, such as an initial value; or may set a beam width of user equipment on which beam width adjusting is not performed to a beam width of the user equipment at a previous time interval.

In this embodiment of the present invention, after acquiring, at a current time interval, a beam adjustment parameter of user equipment, a base station adjusts a beam width of the user equipment according to the beam adjustment parameter of the user equipment; and performs precoding processing on to-be-transmitted data of the user equipment according to an adjusted beam width of the user equipment, so as to perform data transmission. A beam width of user equipment is changed, so that a direction of a beam can better match a direction of a user. Therefore, a performance loss can be effectively reduced.

The embodiments shown in FIG. 1 and FIG. 2 describe a technical solution in which a base station side adjusts a beam width of user equipment according to a beam adjustment parameter of the user equipment. The base station may directly receive the beam adjustment parameter sent by a user equipment side, or may receive a beam adjustment reference parameter sent by a user equipment side, so that the base station can obtain the beam adjustment parameter of the user equipment according to the beam adjustment reference parameter.

Figure 5:
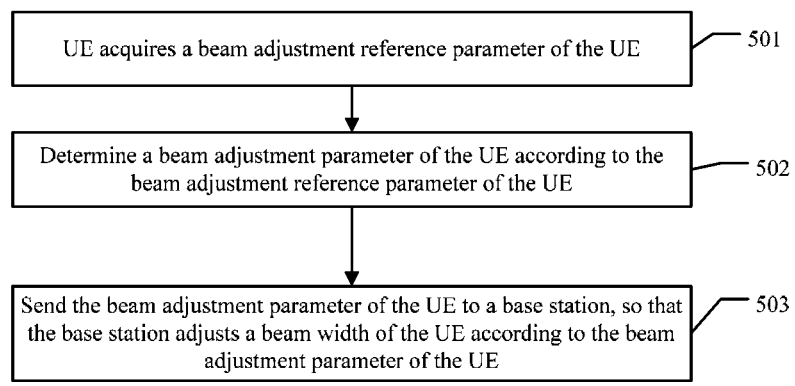
FIG. 5 is a schematic diagram of an adaptive multi-antenna data transmission method according to an embodiment of the present invention.

The following describes a method used by user equipment to obtain a beam adjustment parameter before the user equipment sends the beam adjustment parameter of the user equipment to a base station. Referring to FIG. 5, FIG. 5 is an embodiment of an adaptive multi-antenna data transmission method according to the embodiments of the present invention. The method includes:

501. user equipment acquires a beam adjustment reference parameter of the user equipment.

In this embodiment of the present invention, the user equipment may acquire the beam adjustment reference parameter of the user equipment at a current time interval. The beam adjustment reference parameter may be used to adjust a beam width of the user equipment. The beam adjustment reference parameter may be a CQI or an SINR of the user equipment at the current time interval.

502. Determine a beam adjustment parameter of the user equipment according to the beam adjustment reference parameter of the user equipment.

In this embodiment of the present invention, the user equipment may determine the beam adjustment parameter of the user equipment according to the beam adjustment reference parameter of the user equipment. Specifically, the user equipment determines a change speed or change amplitude of an SINR of the user equipment according to the CQI or the SINR of the user equipment at the current time interval and a CQI or an SINR of the user equipment at a previous time interval, and determines the beam adjustment parameter of the user equipment according to the change speed or change amplitude of an SINR of the user equipment.

That the user equipment determines the beam adjustment parameter of the user equipment according to the change speed or change amplitude of an SINR of the user equipment specifically includes:

if the change speed of an SINR of the user equipment is greater than a first preset value, determining that the beam adjustment parameter of the user equipment is a first preset adjustment parameter value; if the change speed of an SINR of the user equipment is less than or equal to the first preset value and is greater than a second preset value, determining that the beam adjustment parameter of the user equipment is a second preset adjustment parameter value; and if the change speed of an SINR of the user equipment is less than or equal to the second preset value, determining that the beam adjustment parameter of the user equipment is a third preset adjustment parameter value; or if the change amplitude of an SINR of the user equipment is greater than a third preset value, determining that the beam adjustment parameter of the user equipment is a fourth preset adjustment parameter value; if the change amplitude of an SINR of the user equipment is less than or equal to the third preset value and is greater than a fourth preset value, determining that the beam adjustment parameter of the user equipment is a fifth preset adjustment parameter value; and if the change amplitude of an SINR of the user equipment is less than or equal to the fourth preset value, determining that the beam adjustment parameter of the user equipment is a sixth preset adjustment parameter value.

503. Send the beam adjustment parameter of the user equipment to a base station, so that the base station adjusts a beam width of the user equipment according to the beam adjustment parameter of the user equipment.

In this embodiment of the present invention, after determining the beam adjustment parameter of the user equipment, the user equipment sends the beam adjustment parameter of the user equipment to the base station, for example, sending the determined beam adjustment parameter to the base station, so that the base station can determine an adjusted beam width according to the beam adjustment parameter of the user equipment, and perform precoding processing, so as to perform data transmission.

In this embodiment of the present invention, user equipment feeds back, to a base station, a beam adjustment parameter obtained based on a CQI or an SINR of the user equipment, so that the base station can adjust a beam width of the user equipment by using the beam adjustment parameter, and perform precoding processing according to an adjusted beam width, so as to perform data transmission. Therefore, a status or quality of a link for the user equipment can be effectively improved and a performance loss can be reduced.

Figure 6:
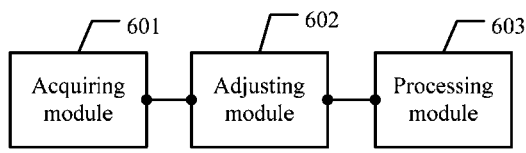
FIG. 6 is a schematic diagram of a structure of a base station according to an embodiment of the present invention.

Referring to FIG. 6, FIG. 6 is an embodiment of a structure of a base station according to the embodiments of the present invention. The base station includes:

an acquiring module 601, configured to acquire, at a current time interval, a beam adjustment parameter of user equipment user equipment;

an adjusting module 602, configured to: after the acquiring module 601 obtains the beam adjustment parameter of the user equipment, adjust a beam width of the user equipment according to the beam adjustment parameter of the user equipment; and a processing module 603, configured to: after the adjusting module 602 obtains an adjusted beam width of the user equipment, perform precoding processing on to-be-transmitted data of the user equipment according to the adjusted beam width of the user equipment and direction information of the user equipment, so as to perform data transmission.

In this embodiment of the present invention, the acquiring module 601 of the base station acquires, at the current time interval, the beam adjustment parameter of the user equipment; then the adjusting module 602 adjusts the beam width of the user equipment according to the beam adjustment parameter of the user equipment; and finally, the processing module 603 performs precoding processing on the to-be-transmitted data of the user equipment according to the adjusted beam width of the user equipment, so as to implement data transmission.

In this embodiment of the present invention, a base station acquires, at a current time interval, a beam adjustment parameter of user equipment; adjusts a beam width of the user equipment according to the beam adjustment parameter of the user equipment; and performs precoding processing on to-be-transmitted data of the user equipment according to an adjusted beam width of the user equipment and direction information of the user equipment, so as to perform data transmission. A beam width of user equipment is adjusted, so that a direction of a beam during data transmission can better match a direction of the user equipment. Therefore, a status or quality of a link for the user equipment is improved and a performance loss is reduced.

Figure 7:
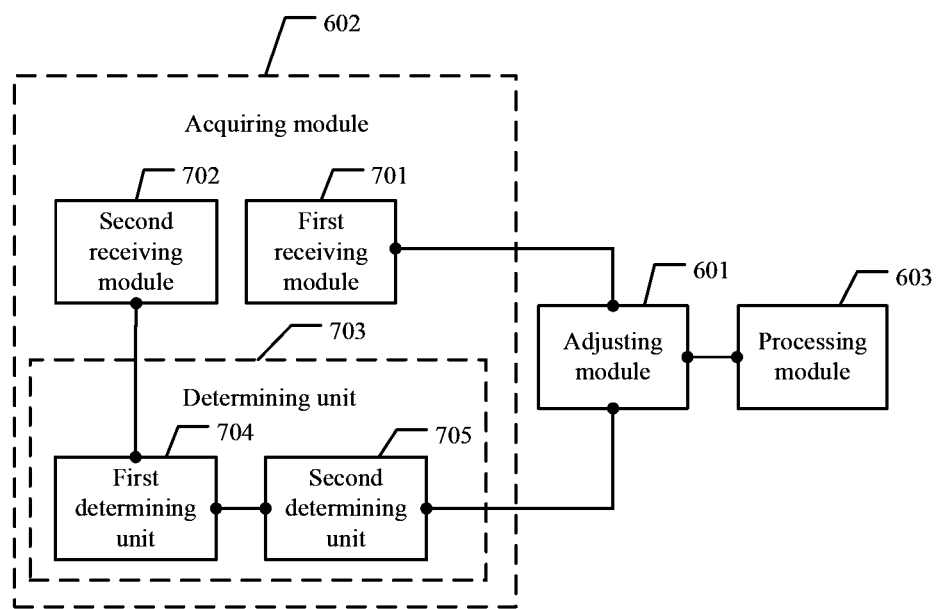
FIG. 7 is another schematic diagram of a structure of a base station according to an embodiment of the present invention.

To better understand a base station in the embodiments of the present invention, refer to FIG. 7, which is an embodiment of a structure of a base station according to the embodiments of the present invention. The base station includes:

the acquiring module 601, the adjusting module 602, and the processing module 603 that are included in the embodiment shown in FIG. 6, which are similar to the content described in the embodiment shown in FIG. 6 and are not described herein again.

In this embodiment of the present invention, the acquiring module 601 includes:

a first receiving module 701, configured to receive a beam adjustment parameter of user equipment sent by the user equipment;

a second receiving module 702, configured to receive a beam adjustment reference parameter of the user equipment sent by the user equipment; and a determining unit 703, configured to: after the second receiving module 702 receives the beam adjustment reference parameter of the user equipment, determine the beam adjustment parameter of the user equipment according to the beam adjustment reference parameter of the user equipment.

In this embodiment of the present invention, the beam adjustment reference parameter is a channel quality indicator CQI or a signal to interference plus noise ratio SINR of the user equipment at a current time interval, and the beam adjustment parameter is a beam adjustment parameter.

The determining unit 703 includes:

a first determining unit 704, configured to: after the second receiving module 702 receives the CQI or the SINR of the user equipment at the current time interval, determine a change speed or change amplitude of an SINR of the user equipment according to the CQI or the SINR of the user equipment at the current time interval and a CQI or an SINR of the user equipment at a previous time interval; and a second determining unit 705, configured to: after the first determining unit 704 determines the change speed or change amplitude of an SINR of the user equipment, determine the beam adjustment parameter of the user equipment according to the change speed or change amplitude of an SINR of the user equipment.

In this embodiment of the present invention, the second determining unit 705 is specifically configured to:

if the change speed of an SINR of the user equipment is greater than a first preset value, determine that the beam adjustment parameter of the user equipment is a first preset adjustment parameter value;

if the change speed of an SINR of the user equipment is less than or equal to the first preset value and is greater than a second preset value, determine that the beam adjustment parameter of the user equipment is a second preset adjustment parameter value; and if the change speed of an SINR of the user equipment is less than or equal to the second preset value, determine that the beam adjustment parameter of the user equipment is a third preset adjustment parameter value; or if the change amplitude of an SINR of the user equipment is greater than a third preset value, determine that the beam adjustment parameter of the user equipment is a fourth preset adjustment parameter value;

if the change amplitude of an SINR of the user equipment is less than or equal to the third preset value and is greater than a fourth preset value, determine that the beam adjustment parameter of the user equipment is a fifth preset adjustment parameter value; and if the change amplitude of an SINR of the user equipment is less than or equal to the fourth preset value, determine that the beam adjustment parameter of the user equipment is a sixth preset adjustment parameter value.

In this embodiment of the present invention, the adjusting module 602 is specifically configured to use a sum of the beam adjustment parameter of the user equipment and a beam width of the user equipment at the previous time interval as an adjusted beam width of the user equipment.

In this embodiment of the present invention, the first receiving module 701 of the acquiring module 601 of the base station receives the beam adjustment parameter of the user equipment sent by the user equipment, or the second receiving module 702 of the acquiring module 601 of the base station receives the beam adjustment reference parameter of the user equipment sent by the user equipment, and the determining unit 703 of the acquiring module 601 determines the beam adjustment parameter of the user equipment according to the beam adjustment reference parameter of the user equipment.

If the beam adjustment reference parameter is a CQI or an SINR of the user equipment at a current time interval, and when the beam adjustment parameter is a beam adjustment parameter, the determining unit 703 is specifically: the first determining unit 704 determines a change speed or a change direction of an SINR of the user equipment according to the CQI or the SINT of the user equipment at the current time interval and a CQI or an SINR of the user equipment at a previous time interval, and the second determining unit 705 determines the beam adjustment parameter of the user equipment according to the change speed or change amplitude of an SINR of the user equipment.

That the second determining unit 705 determines the beam adjustment parameter of the user equipment is specifically: if the change speed of an SINR of the user equipment is greater than a first preset value, determining that the beam adjustment parameter of the user equipment is a first preset adjustment parameter value; if the change speed of an SINR of the user equipment is less than or equal to the first preset value and is greater than a second preset value, determining that the beam adjustment parameter of the user equipment is a second preset adjustment parameter value; and if the change speed of an SINR of the user equipment is less than or equal to the second preset value, determining that the beam adjustment parameter of the user equipment is a third preset adjustment parameter value; or if the change amplitude of an SINR of the user equipment is greater than a third preset value, determining that the beam adjustment parameter of the user equipment is a fourth preset adjustment parameter value; if the change amplitude of an SINR of the user equipment is less than or equal to the third preset value and is greater than a fourth preset value, determining that the beam adjustment parameter of the user equipment is a fifth preset adjustment parameter value; and if the change amplitude of an SINR of the user equipment is less than or equal to the fourth preset value, determining that the beam adjustment parameter of the user equipment is a sixth preset adjustment parameter value.

After the acquiring module 601 obtains the beam adjustment parameter of the user equipment, the adjusting module 602 uses a sum of the beam adjustment parameter of the user equipment and a beam width of the user equipment at the previous time interval as an adjusted beam width of the user equipment. Finally, the processing module 603 performs precoding processing on to-be-transmitted data of the user equipment according to the adjusted beam width of the user equipment, so as to implement data transmission.

In this embodiment of the present invention, after acquiring, at a current time interval, a beam adjustment parameter of user equipment, a base station adjusts a beam width of the user equipment according to the beam adjustment parameter of the user equipment; and performs precoding processing on to-be-transmitted data of the user equipment according to an adjusted beam width of the user equipment, so as to perform data transmission. A beam width of beam widths of user equipment is changed, so that a direction of a beam can better match a direction of a user. Therefore, a performance loss can be effectively reduced.

Figure 8:
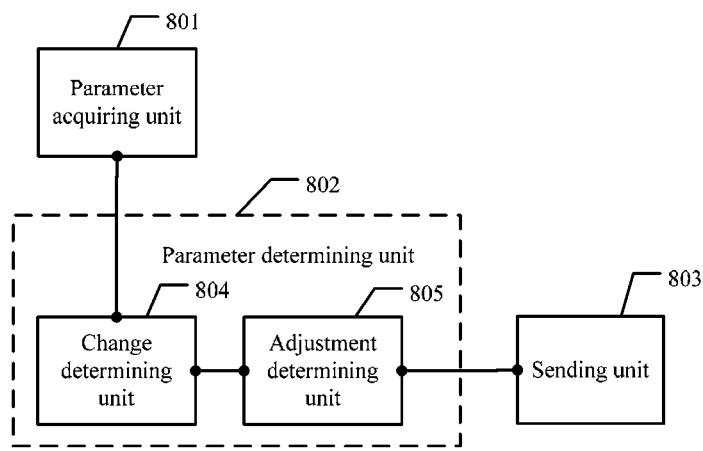
FIG. 8 is a schematic diagram of a structure of user equipment according to an embodiment of the present invention.

Referring to FIG. 8, FIG. 8 is an embodiment of a structure of user equipment according to the embodiments of the present invention. The user equipment includes:

a parameter acquiring unit 801, configured to acquire a beam adjustment reference parameter of the user equipment;

a parameter determining unit 802, configured to: after the parameter acquiring unit 801 acquires the beam adjustment reference parameter of the user equipment, determine a beam adjustment parameter of the user equipment according to the beam adjustment reference parameter of the user equipment; and a sending unit 803, configured to: after the parameter determining unit 802 determines the beam adjustment parameter of the user equipment, send the beam adjustment parameter of the user equipment to a base station, so that the base station adjusts a beam width of the user equipment according to the beam adjustment parameter of the user equipment.

In this embodiment of the present invention, the beam adjustment reference parameter is a channel quality indicator CQI or a signal to interference plus noise ratio SINR of the user equipment at a current time interval, and the beam adjustment parameter of the user equipment is a beam adjustment parameter of the user equipment.

The parameter determining unit 802 includes:

a change determining unit 804, configured to: after the parameter acquiring unit 801 acquires the beam adjustment reference parameter of the user equipment, determine a change speed or change amplitude of an SINR of the user equipment according to the CQI or the SINR of the user equipment at the current time interval and a CQI or an SINR of the user equipment at a previous time interval; and an adjustment determining unit 805, configured to: after the change determining unit 804 determines the change speed or change amplitude of an SINR of the user equipment, determine the beam adjustment parameter of the user equipment according to the change speed or change amplitude of an SINR of the user equipment, where the adjustment determining unit 805 is specifically configured to: if the change speed of an SINR of the user equipment is greater than a first preset value, determine that the beam adjustment parameter of the user equipment is a first preset adjustment parameter value; if the change speed of an SINR of the user equipment is less than or equal to the first preset value and is greater than a second preset value, determine that the beam adjustment parameter of the user equipment is a second preset adjustment parameter value; and if the change speed of an SINR of the user equipment is less than or equal to the second preset value, determine that the beam adjustment parameter of the user equipment is a third preset adjustment parameter value; or if the change amplitude of an SINR of the user equipment is greater than a third preset value, determine that the beam adjustment parameter of the user equipment is a fourth preset adjustment parameter value; if the change amplitude of an SINR of the user equipment is less than or equal to the third preset value and is greater than a fourth preset value, determine that the beam adjustment parameter of the user equipment is a fifth preset adjustment parameter value; and if the change amplitude of an SINR of the user equipment is less than or equal to the fourth preset value, determine that the beam adjustment parameter of the user equipment is a sixth preset adjustment parameter value.

In this embodiment of the present invention, user equipment feeds back, to a base station, a beam adjustment parameter obtained based on a CQI or an SINR of the user equipment, so that the base station can adjust a beam width of the user equipment by using the beam adjustment parameter, and perform precoding processing according to an adjusted beam width, so as to perform data transmission. Therefore, a status or quality of a link for the user equipment can be effectively improved and a performance loss can be reduced.

Figure 9:
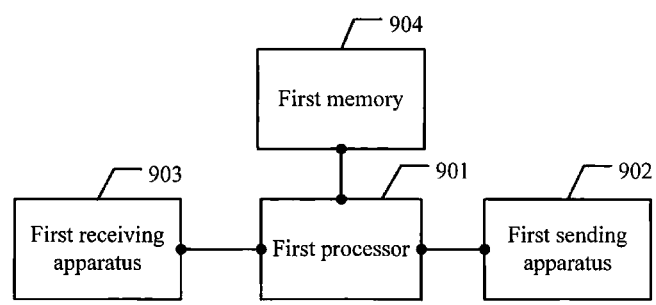
FIG. 9 is a schematic diagram of a structure of a base station according to an embodiment of the present invention.

Referring to FIG. 9, FIG. 9 is an embodiment of a structure of a base station according to the embodiments of the present invention. The base station includes:

a first processor 901, a first sending apparatus 902, a first receiving apparatus 903, and a first memory 904, where the first processor 901 is configured to: acquire, at a current time interval, a beam adjustment parameter of user equipment user equipment; adjust a beam width of the user equipment according to the beam adjustment parameter of the user equipment; and perform precoding processing on to-be-transmitted data of the user equipment according to an adjusted beam width of the user equipment, so as to implement data transmission.

Figure 10:
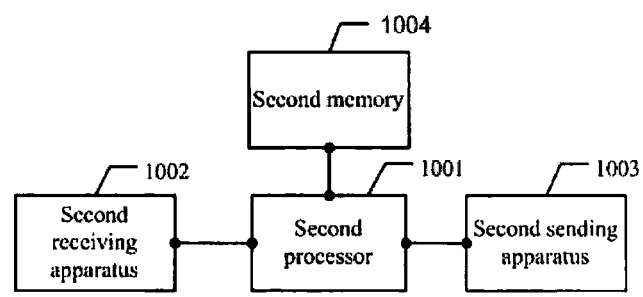
FIG. 10 is another schematic diagram of a structure of user equipment according to an embodiment of the present invention.

Referring to FIG. 10, FIG. 10 is an embodiment of a structure of user equipment according to the embodiments of the present invention. The user equipment includes:

a second processor 1001, a second receiving apparatus 1002, a second sending apparatus 1003, and a second memory 1004, where the second processor 1001 of the user equipment user equipment acquires a beam adjustment reference parameter of the user equipment, determines a beam adjustment parameter of the user equipment according to the beam adjustment reference parameter of the user equipment, and sends the beam adjustment parameter of the user equipment to a base station, so that the base station adjusts a beam width of the user equipment according to the beam adjustment parameter of the user equipment.

Figure 11:
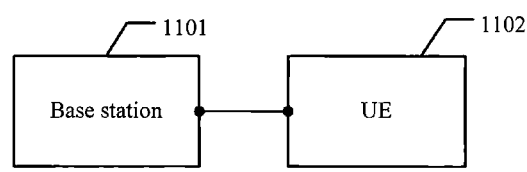
FIG. 11 is a schematic diagram of an adaptive antenna transmission system according to an embodiment of the present invention.

Referring to FIG. 11, FIG. 11 shows an adaptive antenna transmission system according to an embodiment of the present invention. The system includes:

the base station 1101 described in the embodiment shown in FIG. 6, FIG. 7, or FIG. 9, and the user equipment 1102 described in the embodiment shown in FIG. 8 or FIG. 10.

It should be noted that the user equipment 1102 may also directly send a beam adjustment reference parameter of the user equipment to the base station 1101, so that the base station 1101 can obtain a beam adjustment parameter of the user equipment 1102 according to the beam adjustment reference parameter of the user equipment 1102. For example, the user equipment 1102 may send a CQI or an SINR at a current time interval to the base station 1101, so that the base station can obtain a change speed or change amplitude of an SINR of the user equipment 1102 according to the CQI or the SINR of the user equipment 1102 at the current time interval and a CQI or an SINR of the user equipment 1102 at a previous time interval; and obtain the beam adjustment parameter of the user equipment 1102 according to the change speed or change amplitude of an SINR of the user equipment 1102.

A person of ordinary skill in the art may understand that all or some of the steps of the methods in the embodiments may be implemented by a program instructing relevant hardware. The program may be stored in a computer readable storage medium. The storage medium may be: a read-only memory, a magnetic disk, an optical disc or the like.

The foregoing describes in detail an adaptive multi-antenna data transmission method, apparatus, and system that are provided by the present invention. A person of ordinary skill in the art may, based on the idea of the embodiments of the present invention, make modifications to the specific implementation manners and the application scope. To sum up, the content of this specification shall not be construed as a limitation to the present invention. Additionally, statements made herein characterizing the invention refer to an embodiment of the invention and not necessarily all embodiments.

What is claimed is:

1. An adaptive multi-antenna data transmission method, comprising:
   acquiring, by a base station, at a current time interval, a beam adjustment parameter of a user equipment, wherein the beam adjustment parameter of the user equipment is determined according to a change speed or change amplitude of a signal-to-interference plus noise ratio (SINR) of the user equipment;
   using, by the base station, a sum of the beam adjustment parameter of the user equipment and a beam width of the user equipment at a previous time interval as an adjusted beam width of the user equipment;
   performing, by the base station, precoding processing on to-be-transmitted data of the user equipment according to the adjusted beam width of the user equipment and direction information of the user equipment; and
   transmitting, by the base station, the precoded to-be-transmitted data to the user equipment.

2. The method according to claim 1, wherein acquiring the beam adjustment parameter of the user equipment comprises receiving the beam adjustment parameter of the user equipment from the UE.

3. The method according to claim 1, wherein acquiring the beam adjustment parameter of the user equipment comprises:
   receiving a beam adjustment reference parameter of the user equipment from the user equipment; and
   determining the beam adjustment parameter of the user equipment according to the beam adjustment reference parameter of the user equipment.

4. The method according to claim 3, wherein the beam adjustment reference parameter is a channel quality indicator (CQI) or an SINR of the user equipment at the current time interval; and
   wherein determining the beam adjustment parameter of the user equipment according to the beam adjustment reference parameter of the user equipment comprises:
      determining the change speed or change amplitude of an SINR of the user equipment according to the CQI or the SINR of the user equipment at the current time interval and a CQI or an SINR of the user equipment at a previous time interval; and
      determining the beam adjustment parameter of the user equipment according to the determined change speed or change amplitude.

5. The method according to claim 4,
   wherein determining the beam adjustment parameter of the user equipment according to the determined change speed comprises:
      if the determined change speed is greater than a first preset value, determining that the beam adjustment parameter of the user equipment is a first adjustment parameter value;
      if the determined change speed is less than or equal to the first preset value and is greater than a second preset value, determining that the beam adjustment parameter of the user equipment is a second adjustment parameter value; and
      if the determined change speed is less than or equal to the second preset value, determining that the beam adjustment parameter of the user equipment is a third adjustment parameter value;
   or
   wherein determining the beam adjustment parameter of the user equipment according to the determined change amplitude comprises:
      if the determined change amplitude is greater than a third preset value, determining that the beam adjustment parameter of the user equipment is a fourth adjustment parameter value;
      if the determined change amplitude is less than or equal to the third preset value and is greater than a fourth preset value, determining that the beam adjustment parameter of the user equipment is a fifth adjustment parameter value; and
      if the determined change amplitude is less than or equal to the fourth preset value, determining that the beam adjustment parameter of the user equipment is a sixth preset adjustment parameter value.

6. An adaptive multi-antenna data transmission method, comprising:
   acquiring, by a user equipment and at a current time interval, a beam adjustment reference parameter of the user equipment;
   determining, by the user equipment, a beam adjustment parameter of the user equipment according to the beam adjustment reference parameter of the user equipment, wherein the beam adjustment parameter of the user equipment is determined according to a change speed or change amplitude of a signal-to-interference plus noise ratio (SINR) of the user equipment;
   sending, by the user equipment, the beam adjustment parameter of the user equipment to a base station; and
   receiving, by the user equipment, to-be-transmitted data precoded by the base station according to an adjusted beam width of the user equipment and direction information of the user equipment, wherein the adjusted beam width is a sum of the beam adjustment parameter of the user equipment and a beam width of the user equipment at a previous time interval.

7. The adaptive multi-antenna data transmission method according to claim 6, wherein the beam adjustment reference parameter is a channel quality indicator (CQI) or the SINR of the user equipment at the current time interval; and
   determining the beam adjustment parameter of the user equipment according to the beam adjustment reference parameter of the user equipment comprises:
      determining, by the user equipment, the change speed or change amplitude of the SINR of the user equipment according to the CQI or the SINR of the user equipment at the current time interval and a CQI or an SINR of the user equipment at a previous time interval; and
      determining, by the user equipment, the beam adjustment parameter of the user equipment according to the determined change speed or change amplitude.

8. The adaptive multi-antenna data transmission method according to claim 6,
   wherein determining the beam adjustment parameter of the user equipment according to the determined change speed comprises:
      if the determined change speed is greater than a first preset value, determining that the beam adjustment parameter of the user equipment is a first preset adjustment parameter value;
      if the determined change speed is less than or equal to the first preset value and is greater than a second preset value, determining that the beam adjustment parameter of the user equipment is a second preset adjustment parameter value; and
      if the determined change speed is less than or equal to the second preset value, determining that the beam adjustment parameter of the user equipment is a third preset adjustment parameter value;

or wherein determining the beam adjustment parameter of the user equipment according to the determined change amplitude comprises:

if the determined change amplitude is greater than a third preset value, determining that the beam adjustment parameter of the user equipment is a fourth preset adjustment parameter value;

if the determined change amplitude is less than or equal to the third preset value and is greater than a fourth preset value, determining that the beam adjustment parameter of the user equipment is a fifth preset adjustment parameter value; and if the determined change amplitude is less than or equal to the fourth preset value, determining that the beam adjustment parameter of the user equipment is a sixth preset adjustment parameter value.

9. A base station comprising a processor and a non-transitory computer-readable medium having processor-executable instructions stored thereon, the processor-executable instructions, when executed, facilitating performance of the following:

acquiring, at a current time interval, a beam adjustment parameter of a user equipment, wherein the beam adjustment parameter of the user equipment is determined according to a speed or amplitude of change in a signal-to-interference plus noise ratio (SINR) of the user equipment;

using, by the base station, a sum of the beam adjustment parameter of the user equipment and a beam width of the user equipment at a previous time interval as an adjusted beam width of the user equipment;

performing precoding processing on to-be-transmitted data of the user equipment according to the adjusted beam width of the user equipment and direction information of the user equipment; and transmitting, by the base station, the precoded to-be-transmitted data to the user equipment.

10. The base station according to claim 9, wherein acquiring the beam adjustment parameter of the user equipment comprises:

receiving the beam adjustment parameter of the user equipment from the user equipment; or receiving a beam adjustment reference parameter of the user equipment from the user equipment; and determining the beam adjustment parameter of the user equipment according to the beam adjustment reference parameter of the user equipment.

11. The base station according to claim 10, wherein the beam adjustment reference parameter is a channel quality indicator (CQI) or the SINR of the user equipment at the current time interval; and wherein determining the beam adjustment parameter of the user equipment according to the beam adjustment reference parameter comprises:

determining the change speed or change amplitude of an SINR of the user equipment according to the CQI or the SINR of the user equipment at the current time interval and a CQI or an SINR of the user equipment at a previous time interval; and determining the beam adjustment parameter of the user equipment according to the determined change speed or change amplitude.

12. The base station according to claim 11, wherein determining the beam adjustment parameter of the user equipment according to the determined change speed comprises:

if the determined change speed is greater than a first preset value, determining that the beam adjustment parameter of the user equipment is a first preset adjustment parameter value;

if the determined change speed is less than or equal to the first preset value and is greater than a second preset value, determining that the beam adjustment parameter of the user equipment is a second preset adjustment parameter value; and if the determined change speed is less than or equal to the second preset value, determining that the beam adjustment parameter of the user equipment is a third preset adjustment parameter value;

or wherein determining the beam adjustment parameter of the user equipment according to the determined change amplitude comprises:

if the determined change amplitude is greater than a third preset value, determining that the beam adjustment parameter of the UE is a fourth preset adjustment parameter value;

if the determined change amplitude is less than or equal to the third preset value and is greater than a fourth preset value, determining that the beam adjustment parameter of the UE is a fifth preset adjustment parameter value; and if the determined change amplitude is less than or equal to the fourth preset value, determining that the beam adjustment parameter of the user equipment is a sixth preset adjustment parameter value.

13. A user equipment, comprising a processor and a non-transitory computer-readable medium having processor-executable instructions stored thereon, the processor-executable instructions, when executed, facilitating performance of the following:

acquiring a beam adjustment reference parameter of the user equipment at a current time period;

determining a beam adjustment parameter of the user equipment according to the beam adjustment reference parameter of the user equipment, wherein the beam adjustment parameter of the user equipment is determined according to a change speed or change amplitude of a signal-to-interference plus noise ratio (SINR) of the user equipment; and sending the beam adjustment parameter of the user equipment to a base station; and receiving, by the user equipment, to-be-transmitted data precoded by the base station according to an adjusted beam width of the user equipment and direction information of the user equipment, wherein the adjusted beam width is a sum of the beam adjustment parameter of the user equipment and a beam width of the user equipment at a previous time interval.

14. The user equipment according to claim 13, wherein the beam adjustment reference parameter is a channel quality indicator (CQI) or the SINR of the user equipment at the current time interval; and wherein determining the beam adjustment parameter of the user equipment according to the beam adjustment reference parameter of the user equipment comprises:

determining the change speed or change amplitude of an SINR of the user equipment according to the CQI or the SINR of the user equipment at the current time interval and a CQI or an SINR of the user equipment at a previous time interval; and determining the beam adjustment parameter of the user equipment according to the determined change speed or change amplitude.

15. The user equipment according to claim 14, wherein determining the beam adjustment parameter of the user equipment according to the determined change speed or change amplitude comprises:

if the determined change speed is greater than a first preset value, determine that the beam adjustment parameter of the user equipment is a first preset adjustment parameter value;

if the determined change speed is less than or equal to the first preset value and is greater than a second preset value, determine that the beam adjustment parameter of the user equipment is a second preset adjustment parameter value; and if the determined change speed is less than or equal to the second preset value, determine that the beam adjustment parameter of the user equipment is a third preset adjustment parameter value;

or wherein determining the beam adjustment parameter of the user equipment according to the determined change amplitude comprises:

if the determined change amplitude is greater than a third preset value, determine that the beam adjustment parameter of the user equipment is a fourth preset adjustment parameter value;

if the determined change amplitude is less than or equal to the third preset value and is greater than a fourth preset value, determine that the beam adjustment parameter of the user equipment is a fifth preset adjustment parameter value; and if the determined change amplitude is less than or equal to the fourth preset value, determine that the beam adjustment parameter of the user equipment is a sixth preset adjustment parameter value.

16. An adaptive antenna transmission system comprising: a base station and a user equipment, wherein the base station is configured to:

acquire at a current time interval and from the user equipment, a beam adjustment parameter of the user equipment;

use a sum of the beam adjustment parameter of the user equipment and a beam width of the user equipment at a previous time interval as an adjusted beam width of the user equipment;

perform precoding processing on to-be-transmitted data of the user equipment according to the adjusted beam width of the user equipment and direction information of the user equipment; and transmit the precoded to-be-transmitted data to the user equipment; and wherein the user equipment is configured to:

acquire the beam adjustment reference parameter of the user equipment;

determine the beam adjustment parameter of the user equipment according to the beam adjustment reference parameter of the user equipment, wherein the beam adjustment parameter is determined according a change speed or change amplitude of a signal-to-interference plus noise ratio (SINR) of the user equipment;

send the beam adjustment parameter of the user equipment to the base station; and receive to-be-transmitted data precoded by the base station according to an adjusted beam width of the user equipment and direction information of the user equipment, wherein the adjusted beam width is a sum of the beam adjustment parameter of the user equipment and a beam width of the user equipment at a previous time interval.

\* \* \* \* \*